US009197662B2

(12) United States Patent
Mao

(10) Patent No.: US 9,197,662 B2
(45) Date of Patent: Nov. 24, 2015

(54) SYSTEMS AND METHODS FOR OPTIMIZING SCANS OF PRE-INSTALLED APPLICATIONS

(71) Applicant: Symantec Corporation, Mountain View, CA (US)

(72) Inventor: Jun Mao, Culver City, CA (US)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 14/190,471

(22) Filed: Feb. 26, 2014

(65) Prior Publication Data

US 2015/0244729 A1    Aug. 27, 2015

(51) Int. Cl.
*G06F 11/00* (2006.01)
*H04L 29/06* (2006.01)

(52) U.S. Cl.
CPC .................................. *H04L 63/145* (2013.01)

(58) Field of Classification Search
CPC .................................................... H04L 63/145
USPC ............................................. 726/23, 24, 29
See application file for complete search history.

(56) References Cited

U.S. PATENT DOCUMENTS

| 8,161,012 B1* | 4/2012 | Gerraty et al. ............... 707/687 |
| 8,533,830 B1* | 9/2013 | Dalcher ......................... 726/23 |
| 2009/0216811 A1* | 8/2009 | Manczak et al. .............. 707/201 |
| 2011/0047620 A1 | 2/2011 | Mahaffey et al. |
| 2012/0297456 A1 | 11/2012 | Rose et al. |
| 2013/0185800 A1* | 7/2013 | Miller et al. ................... 726/24 |
| 2013/0305392 A1* | 11/2013 | Bar-El et al. ................... 726/29 |
| 2014/0181975 A1* | 6/2014 | Spernow et al. ............... 726/23 |
| 2015/0067862 A1* | 3/2015 | Yu et al. ......................... 726/24 |

FOREIGN PATENT DOCUMENTS

WO    WO-2013/142948    10/2013

OTHER PUBLICATIONS

Lee Gummerman; Systems and Methods for Detecting Malware; U.S. Appl. No. 13/607,398, filed Sep. 7, 2012.
Carey Nachenberg; Systems and Methods for Detecting Malicious Files; U.S. Appl. No. 13/715,265, filed Dec. 14, 2012.
Haik Mesropian; Systems and Methods for Securing Computing Devices Against Imposter Processes; U.S. Appl. No. 13/926,050, filed Jun. 25, 2013.
Xue Feng Tian, et al.; Systems and Methods for Providing Controls for Application Behavior; U.S. Appl. No. 13/952,522; filed Jul. 26, 2013.
"Lookout", https://www.lookout.com/, as accessed Dec. 30, 2013, (Jan. 2, 1997).
"McAfee", http://www.mcafee.com/us/, as accessed Dec. 30, 2013, (Feb. 29, 2000).

* cited by examiner

*Primary Examiner* — Haresh N Patel
(74) *Attorney, Agent, or Firm* — ALG Intellectual Property, LLC

(57) ABSTRACT

A computer-implemented method for optimizing scans of pre-installed applications may include (1) identifying, on a client device, a plurality of applications that are subject to scan-based assessments, (2) determining that the plurality of applications were pre-installed on the client device via a system image for the client device, (3) generating a fingerprint that represents the system image, and (4) fulfilling the scan-based assessments for the plurality of applications by transmitting the fingerprint that represents the system image to an assessment server and receiving, in response, an assessment of the system image. Various other methods, systems, and computer-readable media are also disclosed.

20 Claims, 6 Drawing Sheets

SYSTEMS AND METHODS FOR OPTIMIZING SCANS OF PRE-INSTALLED APPLICATIONS

BACKGROUND

Consumers and businesses face a growing tide of malicious software that threatens the stability and performance of their computing devices and the security of their data. Computer programmers with malicious motivations have created and continue to create viruses, Trojan horses, worms, and other programs (collectively known as "malware") in an attempt to compromise computing devices. In an attempt to evade detection, malicious programmers may inject malware into or among legitimate programs.

Many security software companies attempt to combat malware by creating and deploying malware signatures (e.g., hash functions that uniquely identify malware) to their customers on a regular basis. However, performing signature-based security assessments may consume a significant amount of computing resources, particularly in the case of mobile computing devices, where network resources and other computational resources may be in limited supply. In addition, many computing systems, including mobile computing devices, may come with several pre-installed applications, placing a computational burden on both mobile computing devices and security servers that supply security assessments for applications installed on the mobile computing devices.

Accordingly, the instant disclosure identifies and addresses a need for additional and improved systems and methods for optimizing scans of pre-installed applications.

SUMMARY

As will be described in greater detail below, the instant disclosure describes various systems and methods for optimizing scans of pre-installed applications by performing a single look-up for a system image to retrieve an assessment of the system image in place of performing separate look-ups for each pre-installed application included in the system image.

In one example, a computer-implemented method for optimizing scans of pre-installed applications may include (1) identifying, on a client device, a plurality of applications that are subject to scan-based assessments, (2) determining that the plurality of applications were pre-installed on the client device via a system image for the client device, (3) generating a fingerprint that represents the system image, and (4) fulfilling the scan-based assessments for the plurality of applications by transmitting the fingerprint that represents the system image to an assessment server and receiving, in response, an assessment of the system image.

In some examples, the scan-based assessments may include (1) an assessment of whether an application within the plurality of applications comprises malware and/or (2) a performance assessment of an application within the plurality of applications. In some embodiments, the scan-based assessments may include an assessment of an application within the plurality of applications based on a permission assigned to the application on the client device that enables the application to access a feature of the client device. In some examples, only a publisher may be allowed to modify any application within the plurality of applications.

In some embodiments, the method may also include (1) identifying, on the client device, an individual application that is subject to at least one scan-based assessment, (2) determining that the individual application was not pre-installed on the client device via the system image for the client device, (3) generating, based on determining that the individual application was not-preinstalled on the client device via the system image for the client device, an individual fingerprint that represents the individual application and no other application, and (4) fulfilling the scan-based assessments for the individual application by transmitting the individual fingerprint that represents the individual application to the assessment server and receiving, in response, an assessment of the individual application.

In some examples, (1) the assessment of the system image may include an assessment of an individual application within the plurality of applications and (2) the assessment of the individual application may indicate that the individual application is subject to a remediation action. In these examples, the method may also include performing the remediation action. Additionally or alternatively, in these examples, the method may also include (1) determining, based on the assessment of the individual application, that transmitting the fingerprint that represents the system image to the assessment server will not suffice for fulfilling subsequent scan-based assessments for the plurality of applications and (2) fulfilling the subsequent scan-based assessments for the plurality of applications by transmitting an individual fingerprint for each application within the plurality of applications to the assessment server in response to determining that transmitting the fingerprint that represents the system image to the assessment server will not suffice for fulfilling the subsequent scan-based assessments.

In some embodiments, generating the fingerprint that represents the system image may include combining an individual fingerprint for each application within the plurality of applications. Additionally or alternatively, generating the fingerprint that represents the system image may include using, as input for generating the fingerprint, a public key that is included with the system image for verifying the system image. In some examples, generating the fingerprint that represents the system image may include generating the fingerprint based on a version of the system image and a build number of the system image.

In one embodiment, a system for implementing the above-described method may include (1) an identification module, stored in memory, that identifies, on a client device, a plurality of applications that are subject to scan-based assessments, (2) a determination module, stored in memory, that determines that the plurality of applications were pre-installed on the client device via a system image for the client device, (3) a generation module, stored in memory, that generates a fingerprint that represents the system image, (4) a fulfilling module, stored in memory, that fulfills the scan-based assessments for the plurality of applications by transmitting the fingerprint that represents the system image to an assessment server and receiving, in response, an assessment of the system image, and (5) at least one physical processor that executes the identification module, the determination module, the generation module and the fulfilling module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) identify, on a client device, a plurality of applications that are subject to scan-based assessments, (2) determine that the plurality of applications were pre-installed on the client device via a system image for the client device, (3) generate a fingerprint that represents the system image, and (4) fulfill the scan-based assessments for the plurality of applications by transmitting the fingerprint that represents the system image to an assessment server and receiving, in response, an assessment of the system image.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
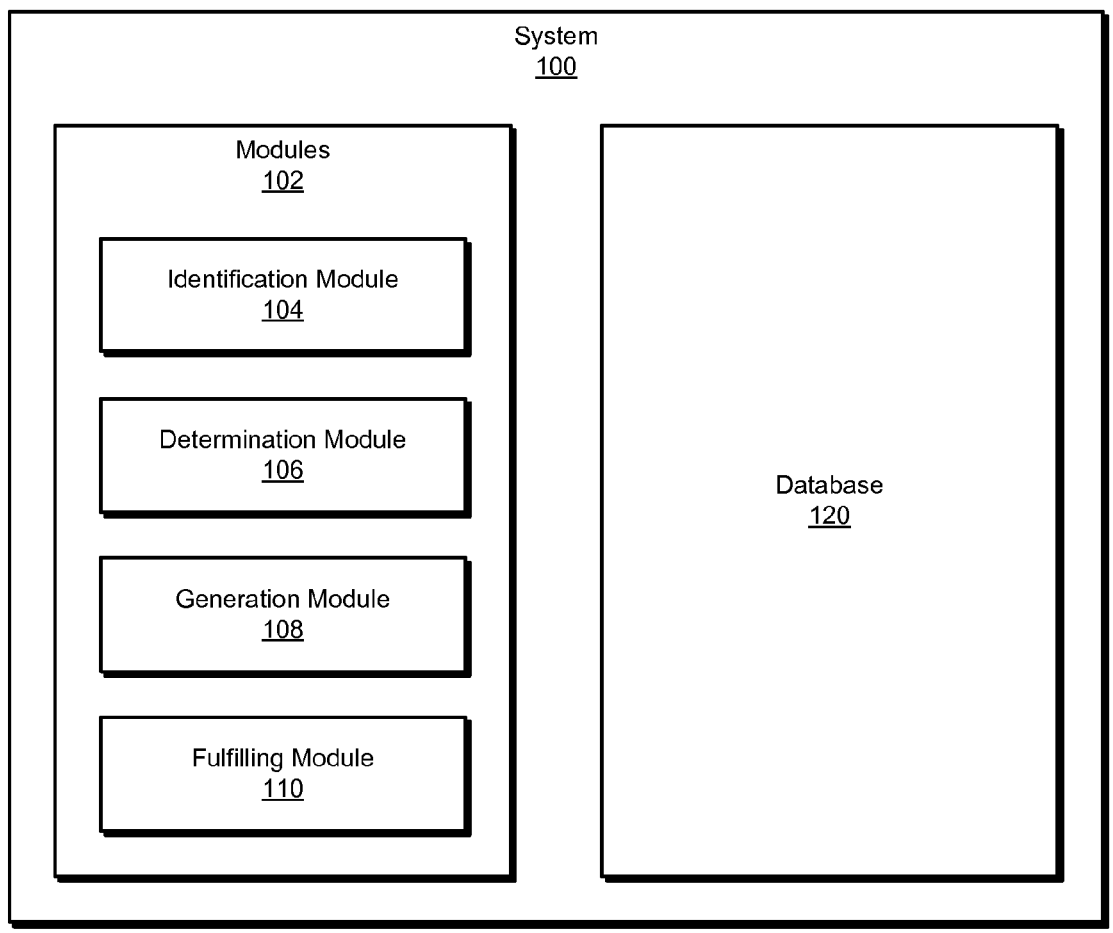
FIG. 1 is a block diagram of an exemplary system for optimizing scans of pre-installed applications.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for optimizing scans of pre-installed applications. As will be explained in greater detail below, by performing a single look-up for a system image to retrieve an assessment of the system image in place of performing separate look-ups for each pre-installed application included in the system image, the systems and methods described herein may reduce the computational burden on both computing devices with pre-installed applications and security servers that supply security assessments for applications installed on the computing devices.

Figure 2:
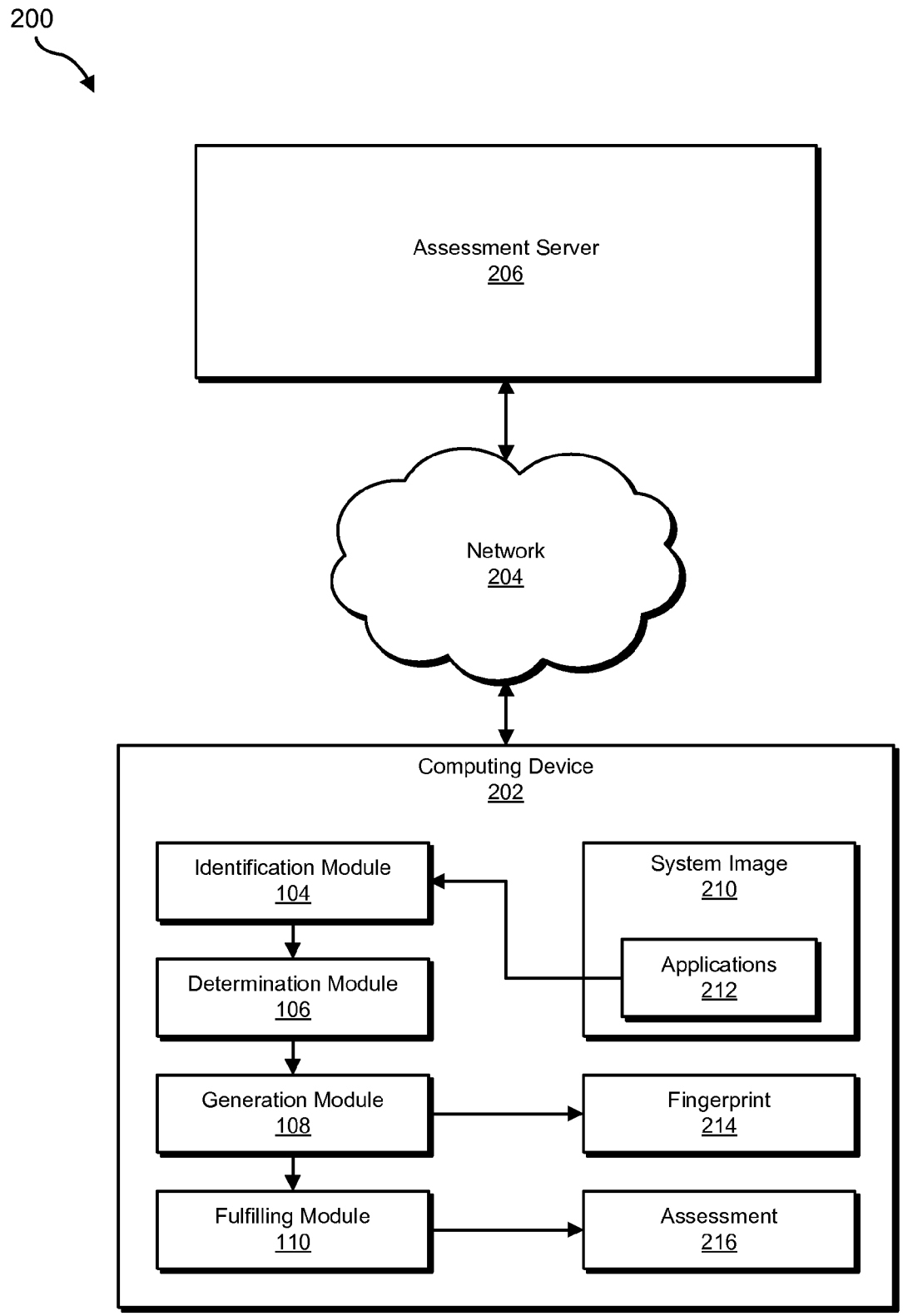
FIG. 2 is a block diagram of an additional exemplary system for optimizing scans of pre-installed applications.
Figure 3:
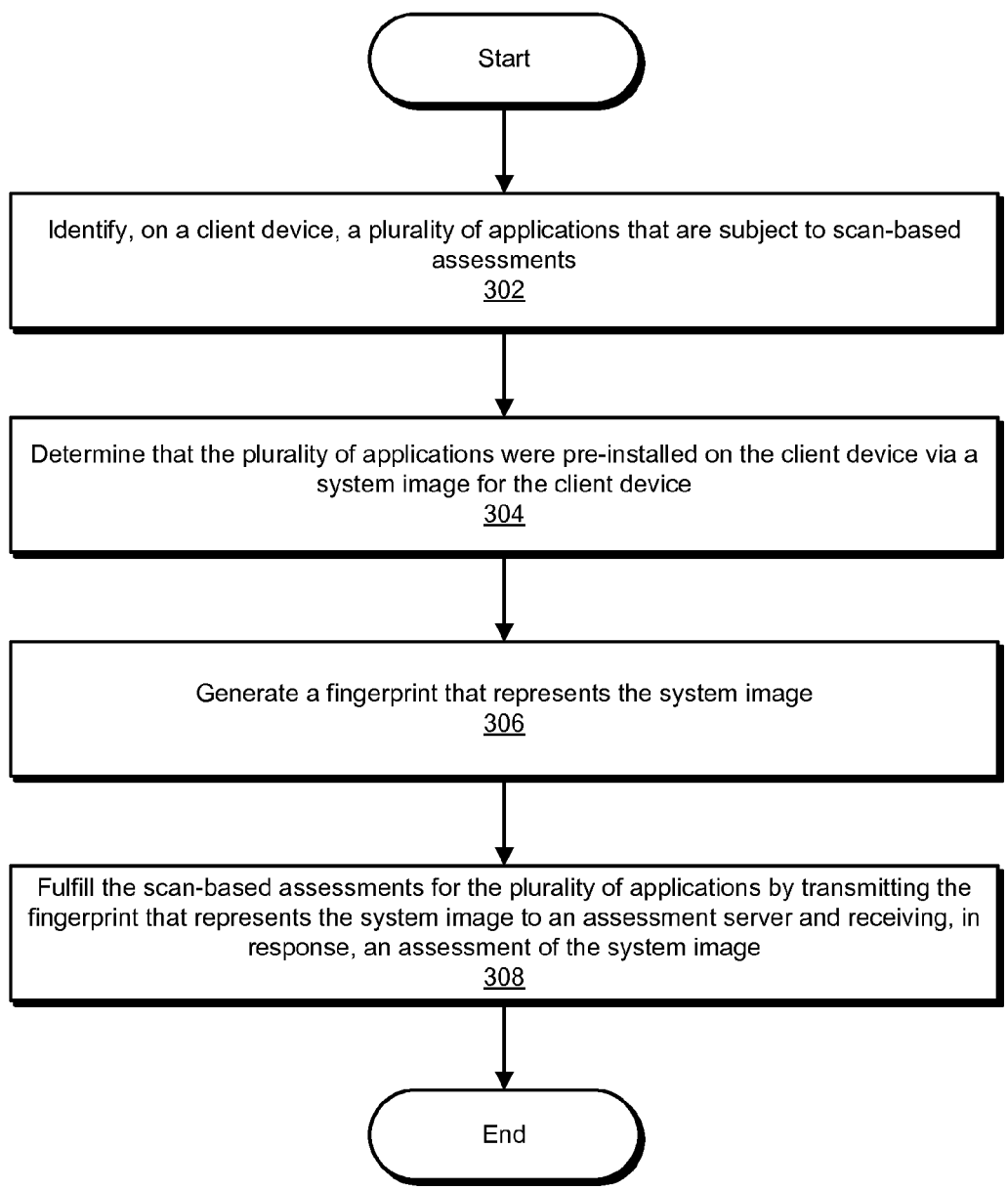
FIG. 3 is a flow diagram of an exemplary method for optimizing scans of pre-installed applications.
Figure 4:
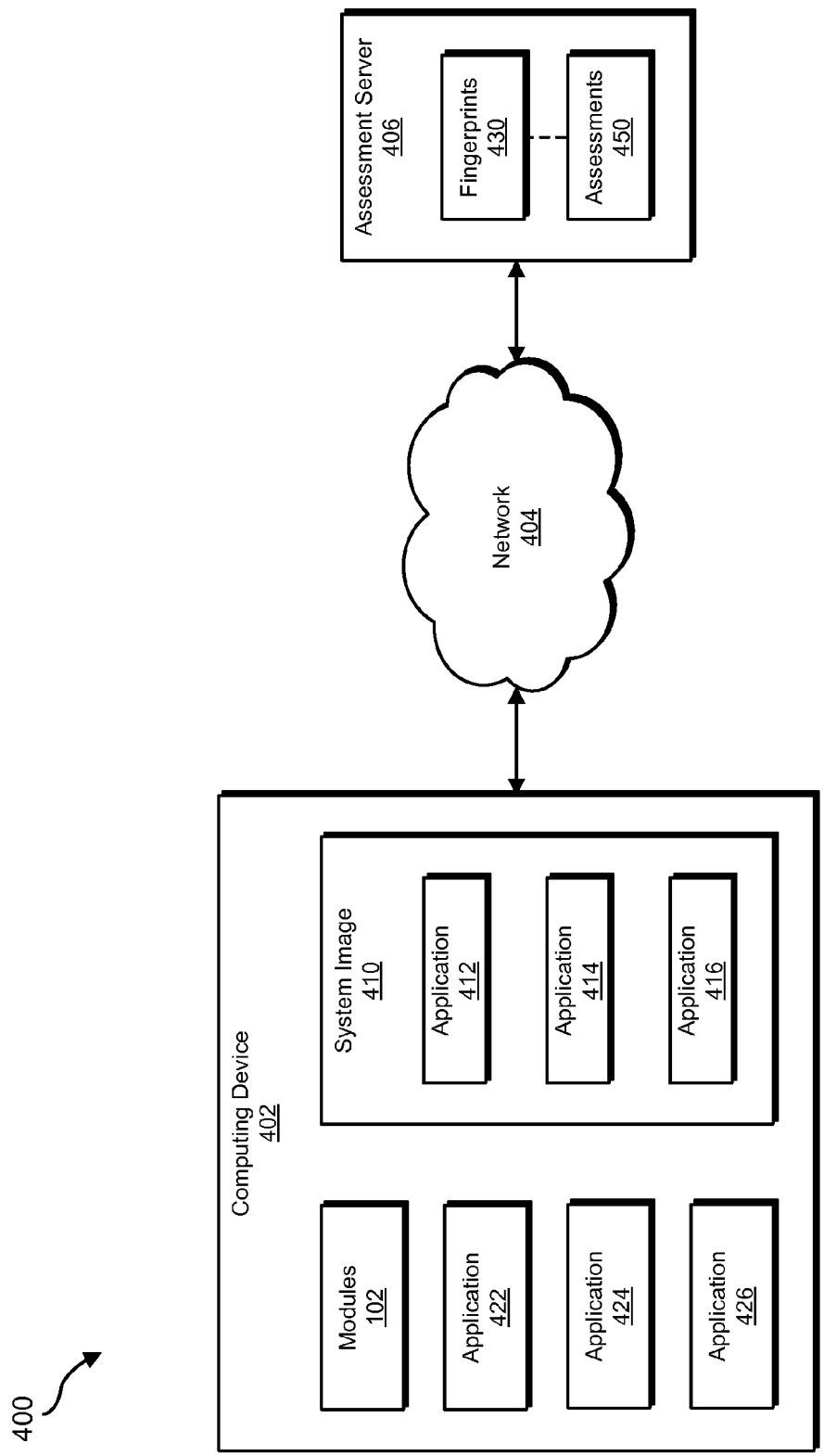
FIG. 4 is a block diagram of an additional exemplary system for optimizing scans of pre-installed applications.

The following will provide, with reference to FIGS. 1, 2, and 4, detailed descriptions of exemplary systems for optimizing scans of pre-installed applications. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for optimizing scans of pre-installed applications. As illustrated in this figure, exemplary system 100 may include one or more modules 102 for performing one or more tasks. For example, and as will be explained in greater detail below, exemplary system 100 may include (1) an identification module 104, stored in memory, that identifies, on a client device, a plurality of applications that are subject to scan-based assessments, (2) a determination module 106, stored in memory, that determines that the plurality of applications were pre-installed on the client device via a system image for the client device, (3) a generation module 108, stored in memory, that generates a fingerprint that represents the system image, and (4) a fulfilling module 110, stored in memory, that fulfills the scan-based assessments for the plurality of applications by transmitting the fingerprint that represents the system image to an assessment server and receiving, in response, an assessment of the system image. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or assessment server 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store one or more application signatures and/or system image signatures.

Database 120 may represent portions of a single database or computing device or a plurality of databases or computing devices. For example, database 120 may represent a portion of assessment server 206 in FIG. 2, computing system 510 in FIG. 5, and/or portions of exemplary network architecture 600 in FIG. 6. Alternatively, database 120 in FIG. 1 may represent one or more physically separate devices capable of being accessed by a computing device, such as assessment server 206 in FIG. 2, computing system 510 in FIG. 5, and/or portions of exemplary network architecture 600 in FIG. 6.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with an assessment server 206 via a network 204. In one example, computing device 202 may be programmed with one or more of modules 102 and/or may store all or a portion of the data in database 120. Additionally or alternatively, assessment server 206 may be programmed with one or more of modules 102 and/or may store all or a portion of the data in database 120.

In one embodiment, one or more of modules 102 from FIG. 1 may, when executed by at least one processor of computing device 202 and/or assessment server 206, enable computing device 202 and/or assessment server 206 to optimize scans of pre-installed applications on computing device 202. For example, and as will be described in greater detail below, one or more of modules 102 may cause computing device 202 and/or assessment server 206 to (1) identify, on computing device 202, a plurality of applications 212 that are subject to scan-based assessments, (2) determine that applications 212 were pre-installed on computing device 202 via a system image 210 for computing device 202, (3) generate a fingerprint 214 that represents system image 210, and (4) fulfill the scan-based assessments for applications 212 by transmitting fingerprint 214 that represents system image 210 to assessment server 206 and receiving, in response, an assessment 216 of system image 210.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 510 in FIG. 5, or any other suitable computing device.

Assessment server 206 generally represents any type or form of computing device that is capable of providing assessments of applications and/or system images based on fingerprints of the applications and/or system images. Examples of assessment server 206 include, without limitation, application servers and database servers configured to provide various database services and/or run certain software applications. For example, assessment server 206 may include a security server.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 600 in FIG. 6, or the like. Network 204 may facilitate communication or data transfer using wireless or wired connections. In one embodiment, network 204 may facilitate communication between computing device 202 and assessment server 206.

FIG. 3 is a flow diagram of an exemplary computer-implemented method 300 for optimizing scans of pre-installed applications. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 one or more of the systems described herein may identify, on a client device, a plurality of applications that are subject to scan-based assessments. For example, identification module 104 may, as part of computing device 202 in FIG. 2, identify, on computing device 202, applications 212 that are subject to scan-based assessments.

The client device may include any computing device that may include pre-installed applications. For example, the client device may include a mobile computing device. Examples of mobile computing devices include, without limitation, mobile phones, tablet computers, e-book readers, personal digital assistants, GPS devices, messaging devices, smartwatches, and head-mounted computing devices.

As used herein, the term "application" may refer to any application, program, module, and/or package that may be installed on and/or that may execute on a computing device. As used herein, the phrase "scan-based assessment" may refer to any assessment of an application that may facilitate gathering information about the application and/or determining a disposition of an application on a computing device (e.g., whether to remove the application, to modify the access of the application to the computing device, to monitor the application, to trust the application, to leave the application intact, to warn a user about the application, to modify a setting of the application, etc.). In some examples, a scan-based assessment may analyzing an application installed on a device. Additionally or alternatively, a scan-based assessment may include generating a fingerprint of an application and querying an assessment server with the fingerprint to receive an assessment of the application in response. For example, the assessment server may store assessments of previously scanned and/or analyzed applications in conjunction with the corresponding fingerprints of the applications.

In some examples, the scan-based assessments may include an assessment of whether an application within the plurality of applications includes malware. As used herein, the term "malware" may refer to any virus, worm, Trojan horse, spyware, and/or any other malicious, illegitimate, and/or unauthorized software and/or data object. In some examples, the scan-based assessment may include a security assessment such as an intrusion prevention analysis (e.g., indicating whether the application includes a vulnerability that may be exploited). In some examples, the scan-based assessments may include a performance assessment of an application within the plurality of applications. For example, the performance assessment may indicate what impact the application has (or is expected to have) on the performance of the computing device (e.g., whether the application has a negative impact on performance, slowing the computing environment of the computing device, contributing to errors and/or crashes, etc.). In some examples, the scan-based assessments may include an assessment of an application within the plurality of applications based on a permission assigned to the application on the client device that enables the application to access a feature of the client device. For example, the assessment may include a determination of which permissions the application requests, whether the permissions requested by the application are necessary and/or appropriate for the application, whether the application is to be trusted with the permissions, the risk that the application having the permissions may pose, etc.

As used herein, the term "permission" may refer to any permission, privilege, designated access right, and/or authentication for accessing, using, manipulating, and/or viewing a computing resource and/or capability. In some examples, the permission may be granted by a user at the time of installation of the application (or, in some examples, in the case of a pre-installed application, granted by default). For example, a platform of the computing device may be configured to display one or more permissions required and/or used by the application and to receive verification that the user will grant the permissions to the application before installing and/or executing the application. In some examples, a platform of the computing device may divide a set of capabilities of the mobile computing system into a set of permissions to access the capabilities, and grant a subset of permissions to each installed application.

Identification module 104 may identify the plurality of applications in any suitable context. For example, identification module 104 may identify the plurality of applications in the course of a comprehensive scan of the computing device. In some examples, identification module 104 may identify the plurality of applications by identifying a system image that includes the plurality of applications.

As an example of identification module 104 operating in one context, FIG. 4 illustrates an exemplary system 400 for optimizing scans of pre-installed applications. As shown in FIG. 4, exemplary system 400 may include a computing device 402 in communication with an assessment server 406 via a network 404. Using FIG. 4 as an example, at step 302 identification module 104 may identify applications 412, 414, and 416 that are subject to a security scan (e.g., along with applications 422, 424, 426, which may also be subject to the security scan).

Returning to FIG. 3, at step 304 one or more of the systems described herein may determine that the plurality of applications were pre-installed on the client device via a system image for the client device. For example, determination module 106 may, as part of computing device 202 in FIG. 2, determine that applications 212 were pre-installed on computing device 202 via system image 210 for computing device 202.

As used herein, the phrase "system image" may refer to any image that may include pre-installed applications. For example, a system image may include a Read-Only Memory (ROM) image. As used herein, the phrase "Read-Only Memory" may refer to any storage medium that is designed to not be frequently modified (or modified at all). Additionally or alternatively, a system image may include firmware.

As used herein, the phrase "pre-installed application" may refer to any application that is installed via a system image (e.g., instead of a user individually selecting the application for installation). In some examples, the phrase "pre-installed application" may refer to applications that are installed on a computing device from the first end-user operation of the computing device. Additionally or alternatively, the phrase "pre-installed application" may refer to applications that are included in system image updates. In some examples, only a publisher of a system image may be allowed to modify any application within the system image (e.g., to remove, update, and/or overwrite the application). In some examples, the publisher of a system image may include a manufacturer of the computing device and/or a partner of the manufacturer of the computing device. Accordingly, in some examples, the system image (and the pre-installed applications included in the system image) may tend to be trustworthy, and the pre-installed applications may tend to require fewer individuated scanning operations.

Determination module 106 may determine that the plurality of applications were pre-installed on the client device via the system image in any suitable manner. For example, determination module 106 may identify a flag associated with each application indicating that the application corresponds to the system image. Additionally or alternatively, determination module 106 may query a platform of the computing device (e.g., via an application programming interface (API)) to retrieve a list of applications that were pre-installed via the system image.

Using FIG. 4 as an example, determination module 106 may, as a part of computing device 402, determine that applications 412, 414, and 416 were pre-installed on computing device 402 via system image 410.

Returning to FIG. 3, at step 306 one or more of the systems described herein may generate a fingerprint that represents the system image. For example, generation module 108 may, as part of computing device 202 in FIG. 2, generate fingerprint 214 that represents system image 210.

As used herein, the term "fingerprint" may refer to any abbreviated representation of an application (e.g., in its current version). For example, the term "fingerprint" may refer to the outputs of one or more hash functions applied to various portions of the application, values extracted from the application, a name of the application, a version number of the application, a publisher of the application, files included in the application, checksums, application metadata, and/or any other type of application identifiers that identify an application. Generally, the fingerprint may include any information tending to identify the application, including any of the aforementioned examples, alone or in combination. The hash values may be generated by any of a variety of cryptographic hash functions (including, e.g., MD5 and/or SHA256). In some examples, the term "fingerprint" as it relates to a given file may refer to a single value that consistently represents the application over time and that does not vary unless the content of the application being fingerprinted varies (e.g., due to updates). In some examples, the term "fingerprint" may refer to a signature of an application.

Generation module 108 may generate the fingerprint of the system image in any suitable manner. For example, generation module 108 may generate the fingerprint of the system image by combining an individual fingerprint for each application within the plurality of applications. For example, generation module 108 may generate a fingerprint for each application on the computing device, and combine those fingerprints corresponding to applications pre-installed via the system image to create a fingerprint of the system image. Additionally or alternatively, generation module 108 may generate the fingerprint that represents the system image by using a public key of the system image as input. For example, the system image may include a public key for verifying the system image. Accordingly, the public key may also be useful for distinctly identifying the system image in the context of the system image having been verified and/or validated. In some examples, in addition to and/or as an alternative to the foregoing possibilities, generation module 108 may generate the fingerprint of the system image based at least in part on a version of the system image and a build number of the system image. In this manner, the fingerprint of the system image may correspond to the particular version of the system image should the system image be updated.

Using FIG. 4 as an example, at step 306 generation module 108 may generate a fingerprint of system image 410. For example, generation module 108 may use metadata pertaining to system image 410 to generate the fingerprint. Additionally or alternatively, generation module 108 may generate the fingerprint of system image 410 based on fingerprints of applications 412, 414, and 416.

Returning to FIG. 3, at step 308 one or more of the systems described herein may fulfill the scan-based assessments for the plurality of applications by transmitting the fingerprint that represents the system image to an assessment server and receiving, in response, an assessment of the system image. For example, fulfilling module 110 may, as part of computing device 202 in FIG. 2, fulfill the scan-based assessments for applications 212 by transmitting fingerprint 214 that represents system image 210 to assessment server 206 and receiving, in response, assessment 216 of system image 210.

The assessment server may include any type of fingerprint look-up system that may provide assessments of applications and/or system images in response to receiving fingerprints of applications and/or system images. For example, the assessment server may include and/or have access to a database correlating current assessments of applications and/or system images with the fingerprints of the applications and/or system images. In some examples, the assessment server may provide application assessments of applications and/or system images to many (e.g., thousands or millions) of client devices. Thus, by reducing the number of look-ups to the assessment server that are required, the systems and methods described herein may significantly reduce computational resources consumed by the assessment server.

The assessment of the system image may include any of a variety of information. For example, the assessment of the system image may include an assessment of an individual application within the plurality of applications. In some examples, the assessment of the individual application may indicate that the individual application is subject to a remediation action. For example, the assessment of the individual application may indicate that the individual application includes malware, includes a security vulnerability, may negatively impact system performance, and/or has inappropriate permissions. In this example, fulfilling module 110 may perform the remediation on the individual application. For example, fulfilling module 110 may remove the individual application, halt execution of the individual application, quarantine the individual application, warn a user about the individual application, analyze actions taken by the individual application on the computing device, and/or remove permissions from the individual application.

In some examples, upon receiving an adverse assessment for the system image (e.g., by receiving an adverse assessment for an individual application within the system image), fulfilling module 110 may stop treating the system image as a single entity for scanning and revert to treating the pre-installed applications on an individual basis. For example, fulfilling module 110 may determine, based on the assessment of the individual application, that transmitting the fingerprint that represents the system image to the assessment server will not suffice for fulfilling subsequent scan-based assessments for the plurality of applications. Fulfilling module 110 may then fulfill the subsequent scan-based assessments for the plurality of applications by transmitting an individual fingerprint for each application within the plurality of applications to the assessment server in response to determining that transmitting the fingerprint that represents the system image to the assessment server will not suffice for fulfilling the subsequent scan-based assessments. In some examples, other events may cause fulfilling module 110 to stop treating the system image as a single entity for scanning and to revert to treating the pre-installed applications on an individual basis. For example, fulfilling module 110 may receive a message indicating that the system image is at risk for being compromised (e.g., via an undiscoverable and/or difficult to observe malware variant).

In some examples, while treating the system image as a single entity for scanning purposes, the systems described herein may treat applications outside the system image (e.g., that weren't pre-installed by the system image) on an individual basis for scanning purposes. For example, identification module 104 may identify, on the client device, an individual application that is subject to at least one scan-based assessment. Determination module 106 may determine that the individual application was not pre-installed on the client device via the system image for the client device. Generation module 108 may generate, based on determining that the individual application was not-preinstalled on the client device via the system image for the client device, an individual fingerprint that represents the individual application and no other application. Fulfilling module may then fulfill the scan-based assessments for the individual application by transmitting the individual fingerprint that represents the individual application to the assessment server and receiving, in response, an assessment of the individual application.

Using FIG. 4 as an example of step 308 in FIG. 3, fulfilling module 110 may, as a part of computing device 402, fulfill the scan-based assessments for applications 412, 414, and 416 by transmitting the fingerprint of system image 410 to assessment server 406. Assessment server 406 may look up the fingerprint of system image 410 within fingerprints 430 and find the corresponding assessment in assessments 450. Assessment server 406 may then return the assessment of system image 410. In one example, the assessment may indicate that application 414 includes malware. Fulfilling module 110 may then fulfill subsequent scan-based assessments of applications 412, 414, and 416 individually (e.g., by sending individual fingerprints for application 412, 414, and 416 to assessment server 406). In some examples, fulfilling module 110 may also fulfill scan-based assessments for applications 422, 424, and 426 (e.g., that are not a part of system image 410) on an individual basis.

In one example, systems described herein may build a unique identifier (e.g., a fingerprint) for each known ROM image (e.g., system image). With the unique identifier, for all applications that come with the system image, systems described herein may only perform one scan. If a cloud lookup is performed as a part of the scan, the cloud lookup may be performed only once. Systems described herein may monitor the ROM distribution and, if a problem is detected, may roll out a signature that targets the ROM image and the specific application with the problem. Additionally or alternatively, these systems may invalidate the ROM and instruct each client device to switch to scanning the applications on an individual basis. Since the majority of ROMs may be expected to be clean, and because pre-installed applications may make up a large proportion of all applications, these systems and methods may save a significant amount of computing resources.

To build a unique identifier for a ROM image, the systems described herein may identify a hash of every pre-installed application and generate a hash based on these identified hashes. In addition, these systems may include information about one or more core system files and/or the version of the ROM image when calculating the hash. Additionally or alternatively, the systems described herein may build the unique identifier for the ROM image by reading the public key that comes with the ROM, and generating the unique identifier from the public key, the ROM version, and the ROM build number. The public key may also be used to validate a ROM update package. In some examples, the systems described herein may build the unique identifier for the ROM image by detecting that the device has not been compromised (and/or, e.g., is trusted to not be compromised) with a customized ROM. In this example, these systems may use the device hardware model in combination with the ROM version and ROM build number to generate a unique identifier for the ROM image.

In some examples, the systems described herein may selectively target a specific set of computing device models for scanning by system image. In one example, these systems may stop scanning by the unique identifier of the ROM image if an application is discovered which could use an exploit to change the underlying system of a computing device. In this example, these systems may revert to scanning applications on an individual basis.

Figure 5:
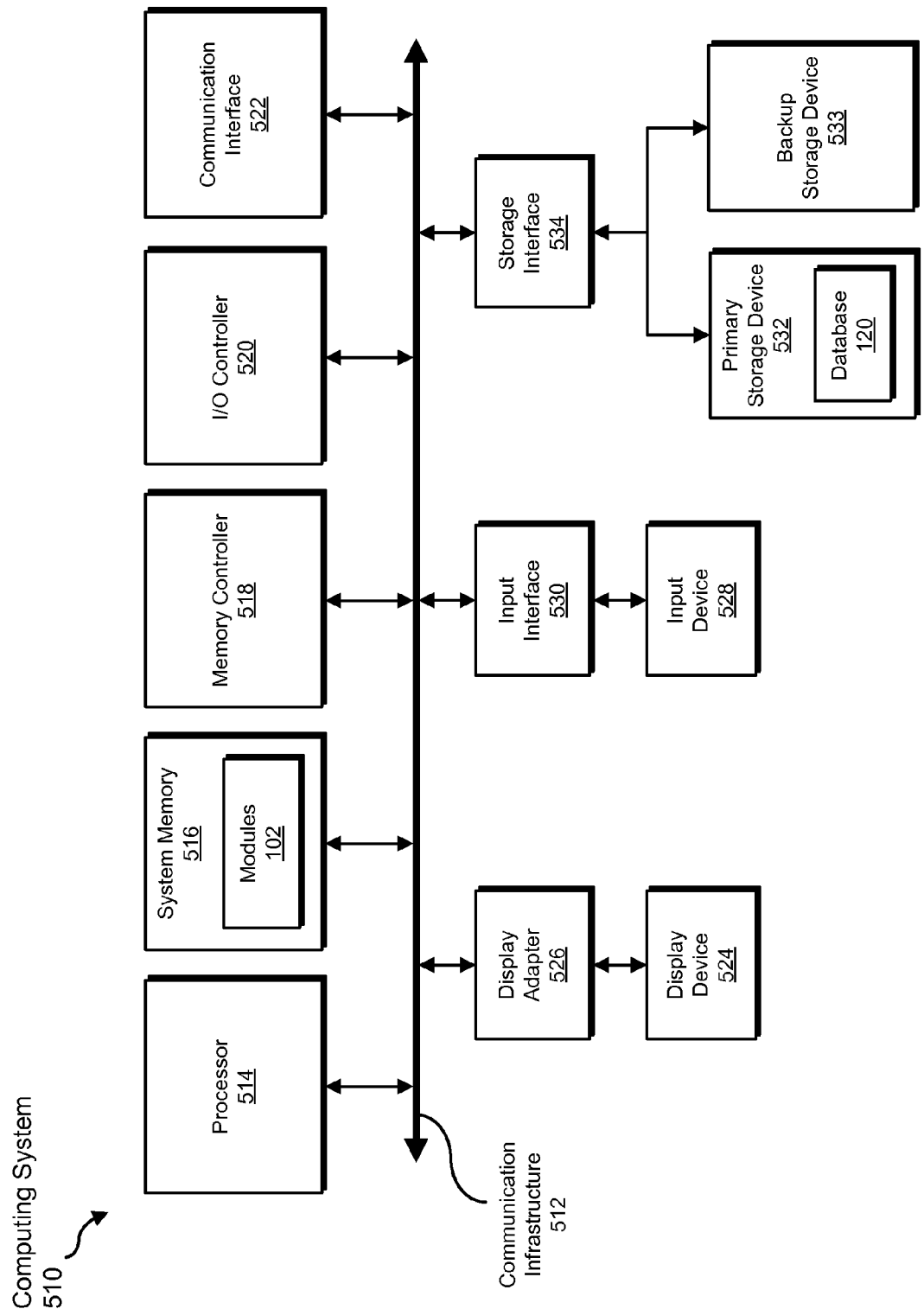
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, database 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an Application Specific Integrated Circuit (ASIC) adapted to implement one or more of the exemplary embodiments disclosed herein.

Figure 6:
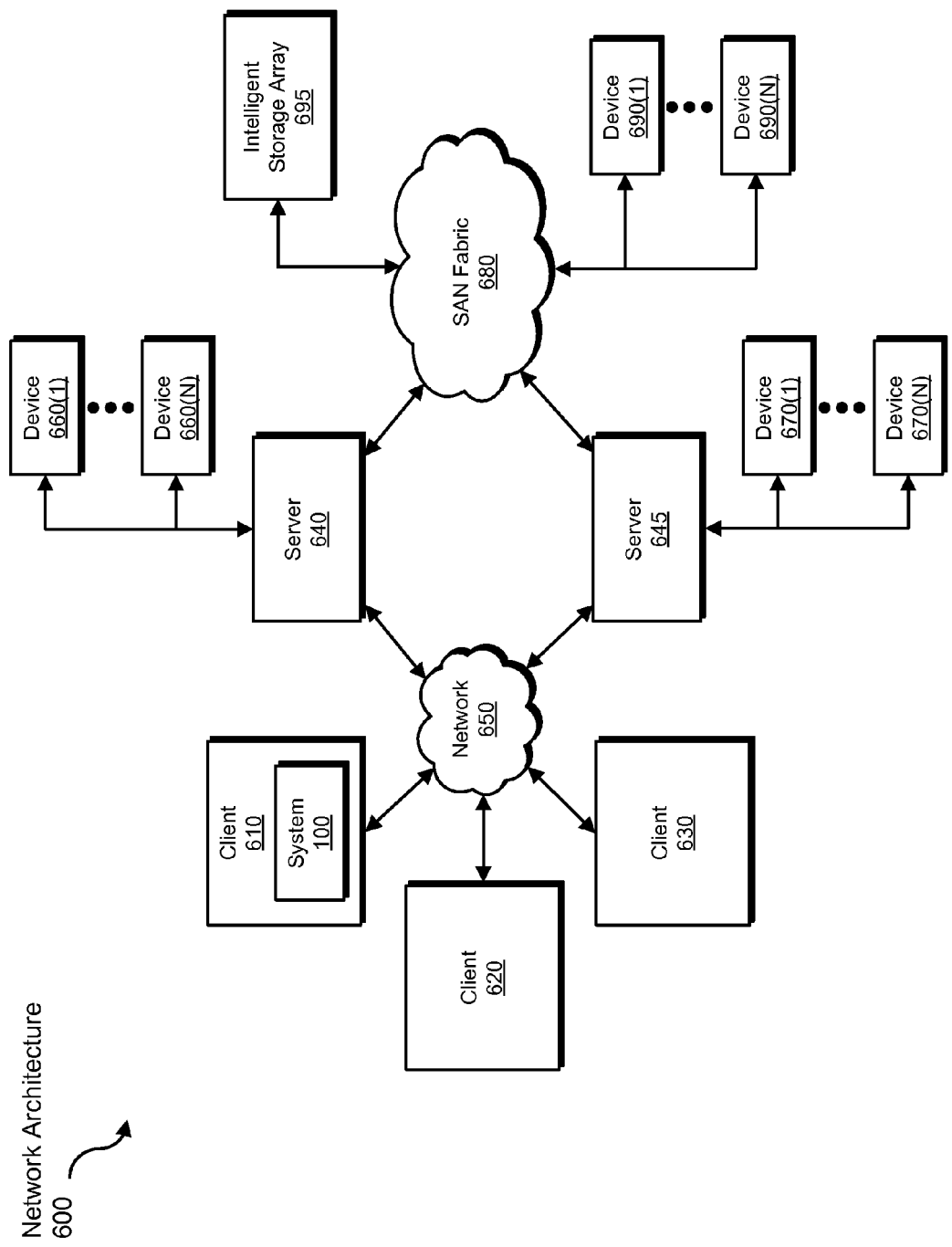
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for optimizing scans of pre-installed applications.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive a fingerprint of a system image to be transformed, transform the fingerprint of the system image into an assessment of one or more pre-installed applications, output a result of the transformation to a security system, use the result of the transformation to address a security issue, and store the result of the transformation to a storage device. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for optimizing scans of pre-installed applications, at least a portion of the method being performed by a computing device comprising at least one processor, the method comprising:
    identifying, by a processor on a client device, a plurality of applications that are subject to scan-based assessments;
    determining that the plurality of applications were pre-installed on the client device via a system image for the client device;
    generating a fingerprint that represents the system image;
    fulfilling the scan-based assessments for the plurality of applications by transmitting the fingerprint that represents the system image to an assessment server and receiving, in response, an assessment of the system image;
    identifying, on the client device, an individual application that is subject to at least one scan-based assessment;
    determining that the individual application was not pre-installed on the client device via the system image for the client device;
    generating, based on determining that the individual application was not-preinstalled on the client device via the system image for the client device, an individual fingerprint that represents the individual application and no other application;
    fulfilling the scan-based assessment for the individual application by transmitting the individual fingerprint that represents the individual application to the assessment server and receiving, in response, an assessment of the individual application.

2. The computer-implemented of claim 1, wherein the scan-based assessments comprise at least one of:
    an assessment of whether an application within the plurality of applications comprises malware;
    a performance assessment of an application within the plurality of applications.

3. The computer-implemented method of claim 1, wherein the scan-based assessments comprise an assessment of an application within the plurality of applications based on a permission assigned to the application on the client device that enables the application to access a feature of the client device.

4. The computer-implemented method of claim 1, wherein only a publisher of the system image is allowed to modify any application within the plurality of applications.

5. The computer-implemented method of claim 1, wherein:
    the assessment of the system image comprises an assessment of an individual application within the plurality of applications;
    the assessment of the individual application indicates that the individual application is subject to a remediation action.

6. The computer-implemented method of claim 5, further comprising performing the remediation action.

7. The computer-implemented method of claim 5, further comprising:
    determining, based on the assessment of the individual application, that transmitting the fingerprint that represents the system image to the assessment server will not suffice for fulfilling subsequent scan-based assessments for the plurality of applications;
    fulfilling the subsequent scan-based assessments for the plurality of applications by transmitting an individual fingerprint for each application within the plurality of applications to the assessment server in response to determining that transmitting the fingerprint that represents the system image to the assessment server will not suffice for fulfilling the subsequent scan-based assessments.

8. The computer-implemented method of claim 1, wherein generating the fingerprint that represents the system image comprises combining an individual fingerprint for each application within the plurality of applications.

9. The computer-implemented method of claim 1, wherein generating the fingerprint that represents the system image comprises using, as input for generating the fingerprint, a public key that is included with the system image for verifying the system image.

10. The computer-implemented method of claim 1, wherein generating the fingerprint that represents the system image comprises generating the fingerprint based on a version of the system image and a build number of the system image.

11. A system for optimizing scans of pre-installed applications, the system comprising:
    an identification module, stored in memory, that:
        identifies, on a client device, a plurality of applications that are subject to scan-based assessments;
        identifies, on the client device, an individual application that is subject to at least one scan-based assessment;
    a determination module, stored in memory, that:
        determines that the plurality of applications were pre-installed on the client device via a system image for the client device;
        determines that the individual application was not pre-installed on the client device via the system image for the client device;

a generation module, stored in memory, that:
   generates a fingerprint that represents the system image;
   generates, based on determining that the individual application was not-preinstalled on the client device via the system image for the client device, an individual fingerprint that represents the individual application and no other application;
a fulfilling module, stored in memory, that:
   fulfills the scan-based assessments for the plurality of applications by transmitting the fingerprint that represents the system image to an assessment server and receiving, in response, an assessment of the system image;
   fulfills the scan-based assessment for the individual application by transmitting the individual fingerprint that represents the individual application to the assessment server and receiving, in response, an assessment of the individual application;
at least one physical processor that executes the identification module, the determination module, the generation module and the fulfilling module.

12. The system of claim 11, wherein the scan-based assessments comprise at least one of:
   an assessment of whether an application within the plurality of applications comprises malware;
   a performance assessment of an application within the plurality of applications.

13. The system of claim 11, wherein the scan-based assessments comprise an assessment of an application within the plurality of applications based on a permission assigned to the application on the client device that enables the application to access a feature of the client device.

14. The system of claim 11, wherein only a publisher of the system image is allowed to modify any application within the plurality of applications.

15. The system of claim 11, wherein:
   the assessment of the system image comprises an assessment of an individual application within the plurality of applications;
   the assessment of the individual application indicates that the individual application is subject to a remediation action.

16. The system of claim 15, wherein the fulfilling module further performs the remediation action.

17. The system of claim 15, wherein:
   the determination module further determines, based on the assessment of the individual application, that transmitting the fingerprint that represents the system image to the assessment server will not suffice for fulfilling subsequent scan-based assessments for the plurality of applications;
   the fulfilling module further fulfills the subsequent scan-based assessments for the plurality of applications by transmitting an individual fingerprint for each application within the plurality of applications to the assessment server in response to determining that transmitting the fingerprint that represents the system image to the assessment server will not suffice for fulfilling the subsequent scan-based assessments.

18. A non-transitory computer-readable medium comprising one or more computer-executable instructions that, when executed by at least one processor of a computing device, cause the computing device to:
   identify, on a client device, a plurality of applications that are subject to scan-based assessments;
   determine that the plurality of applications were pre-installed on the client device via a system image for the client device;
   generate a fingerprint that represents the system image;
   fulfill the scan-based assessments for the plurality of applications by transmitting the fingerprint that represents the system image to an assessment server and receiving, in response, an assessment of the system image;
   identify, on the client device, an individual application that is subject to at least one scan-based assessment;
   determine that the individual application was not pre-installed on the client device via the system image for the client device;
   generate, based on determining that the individual application was not-preinstalled on the client device via the system image for the client device, an individual fingerprint that represents the individual application and no other application;
   fulfill the scan-based assessment for the individual application by transmitting the individual fingerprint that represents the individual application to the assessment server and receiving, in response, an assessment of the individual application.

19. The non-transitory computer-readable medium of claim 18, wherein the scan-based assessments comprise at least one of:
   an assessment of whether an application within the plurality of applications comprises malware;
   a performance assessment of an application within the plurality of applications.

20. The non-transitory computer-readable medium of claim 18, wherein the scan-based assessments comprise an assessment of an application within the plurality of applications based on a permission assigned to the application on the client device that enables the application to access a feature of the client device.

* * * * *